(12) United States Patent
Starr et al.

(10) Patent No.: US 10,024,486 B2
(45) Date of Patent: Jul. 17, 2018

(54) COLLAPSIBLE FLUID CONTAINMENT DEVICES WITH LOCKING SIDEWALL BRACES

(71) Applicant: New Pig Corporation, Tipton, PA (US)

(72) Inventors: Robert J. Starr, Tyrone, PA (US); Dane R. Jackson, Port Matilda, PA (US); Daniel Massam, Langhorne, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 14/984,401

(22) Filed: Dec. 30, 2015

(65) Prior Publication Data

US 2016/0185523 A1 Jun. 30, 2016

Related U.S. Application Data

(60) Provisional application No. 62/097,903, filed on Dec. 30, 2014.

(51) Int. Cl.

| | |
|---|---|
| *B65D 88/52* | (2006.01) |
| *F16M 11/20* | (2006.01) |
| *B08B 17/02* | (2006.01) |
| *F16N 31/00* | (2006.01) |
| *B64F 5/30* | (2017.01) |

(52) U.S. Cl.
CPC ....... *F16M 11/2021* (2013.01); *B08B 17/025* (2013.01); *B64F 5/30* (2017.01); *F16N 31/006* (2013.01); *F16M 2200/022* (2013.01)

(58) Field of Classification Search
CPC ........ B08B 17/025; B65D 90/24; B65D 1/42; F16N 31/004

USPC ............................................................. 220/7
See application file for complete search history.

(56) References Cited

U.S. PATENT DOCUMENTS

| | | | | |
|---|---|---|---|---|
| 3,648,909 A | * | 3/1972 | Wisecarver | B65D 21/0226 206/506 |
| 4,020,967 A | * | 5/1977 | Hammond | B65D 7/24 206/511 |
| 5,316,175 A | | 5/1994 | Van Romer | |
| 5,762,233 A | | 6/1998 | Van Romer | |
| 5,924,461 A | * | 7/1999 | Shaw | F16N 31/006 141/86 |
| 6,092,686 A | | 7/2000 | Shaw et al. | |
| 6,880,720 B2 | | 4/2005 | Van Romer | |
| 6,899,242 B2 | * | 5/2005 | Overholt | B65D 11/1833 220/7 |
| 8,562,251 B2 | | 10/2013 | Beak et al. | |

(Continued)

FOREIGN PATENT DOCUMENTS

EP 0685402 A1 5/1995

*Primary Examiner* — Jeffrey Allen
(74) *Attorney, Agent, or Firm* — Alan G. Towner, Esq.; Leech Tishman Fuscaldo & Lampl

(57) ABSTRACT

Portable collapsible fluid containment devices are disclosed comprising sidewall support braces that rotate from a collapsed generally horizontal position to a raised generally vertical position and lock into place. The sidewall braces may be attached to at least one sidewall of the containment device, and when raised support the sidewall in a fluid containment configuration. The sidewall braces comprise a base support leg, a sidewall support arm rotatably mounted on the support leg, and a locking tab for holding the sidewall support arm in the generally vertical position.

18 Claims, 11 Drawing Sheets

(56) References Cited

U.S. PATENT DOCUMENTS

2013/0240538 A1* 9/2013 Beak .................. B65D 90/24
220/646
2014/0246441 A1  9/2014 Starr et al.

* cited by examiner

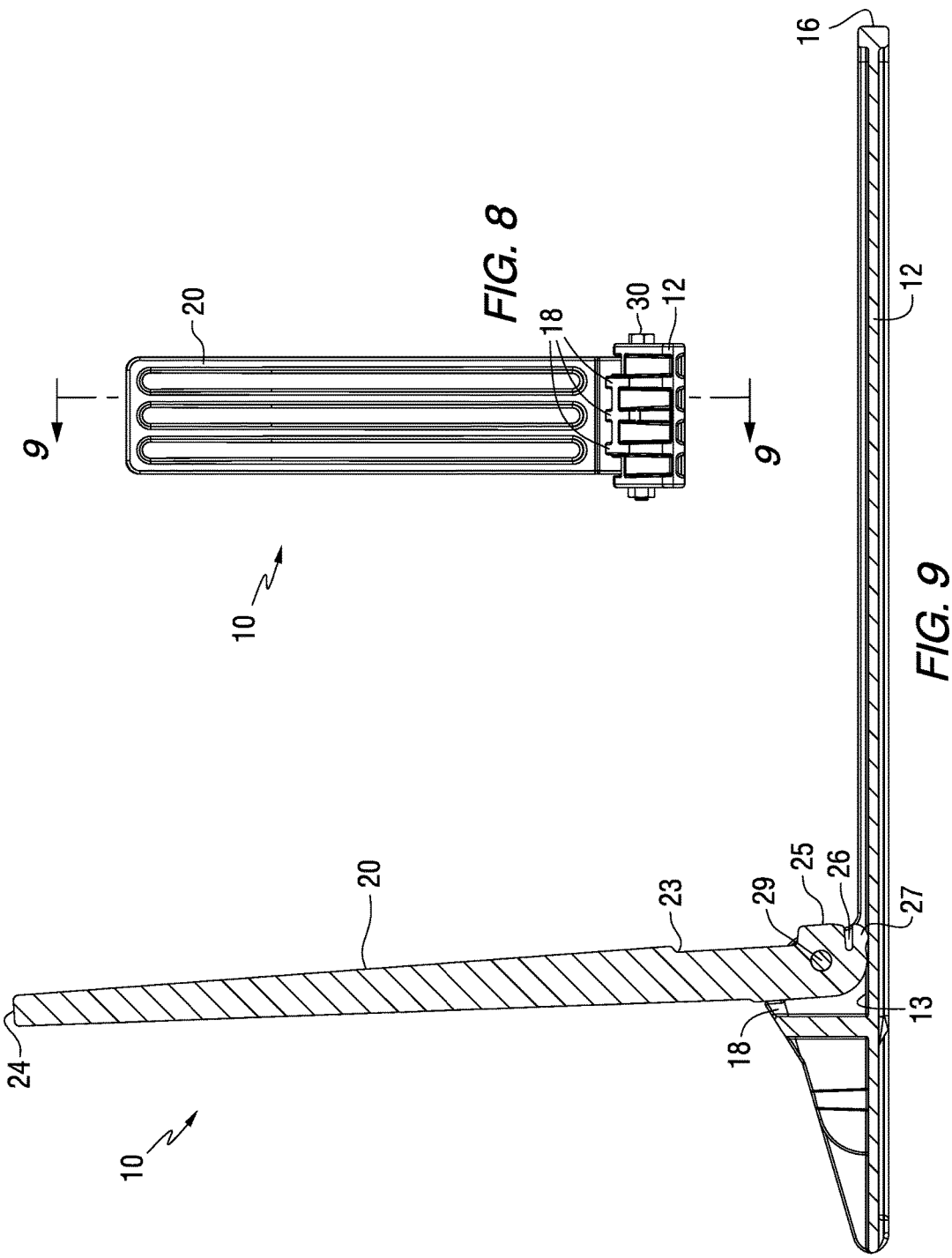

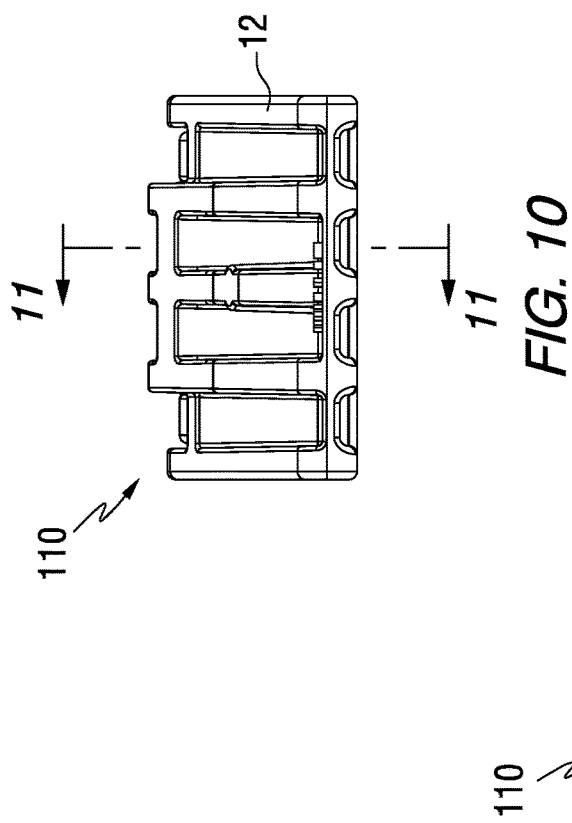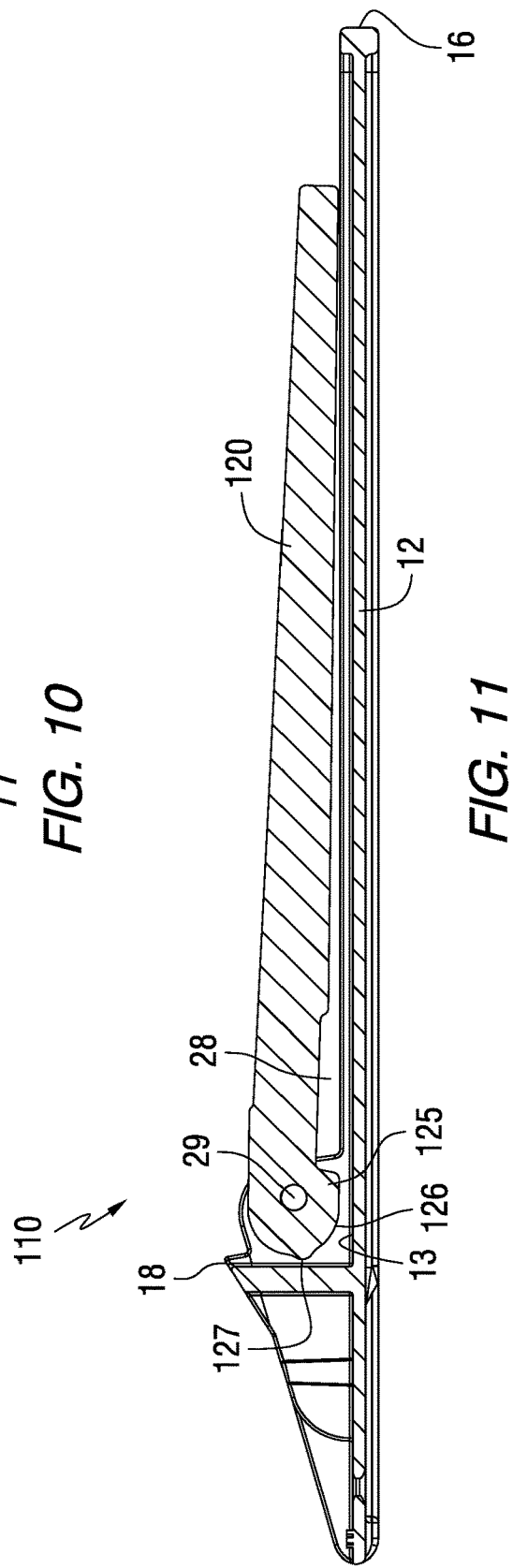

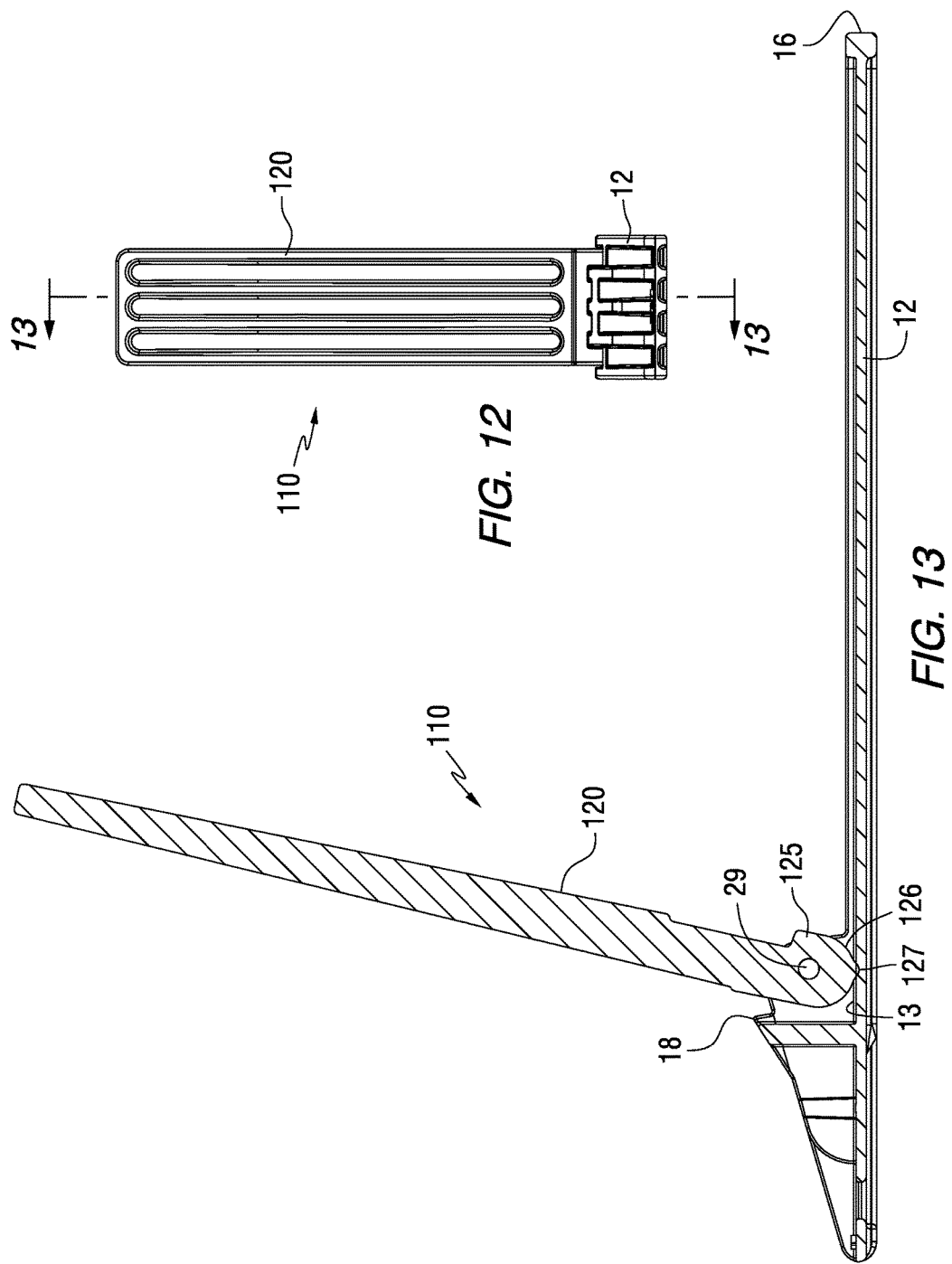

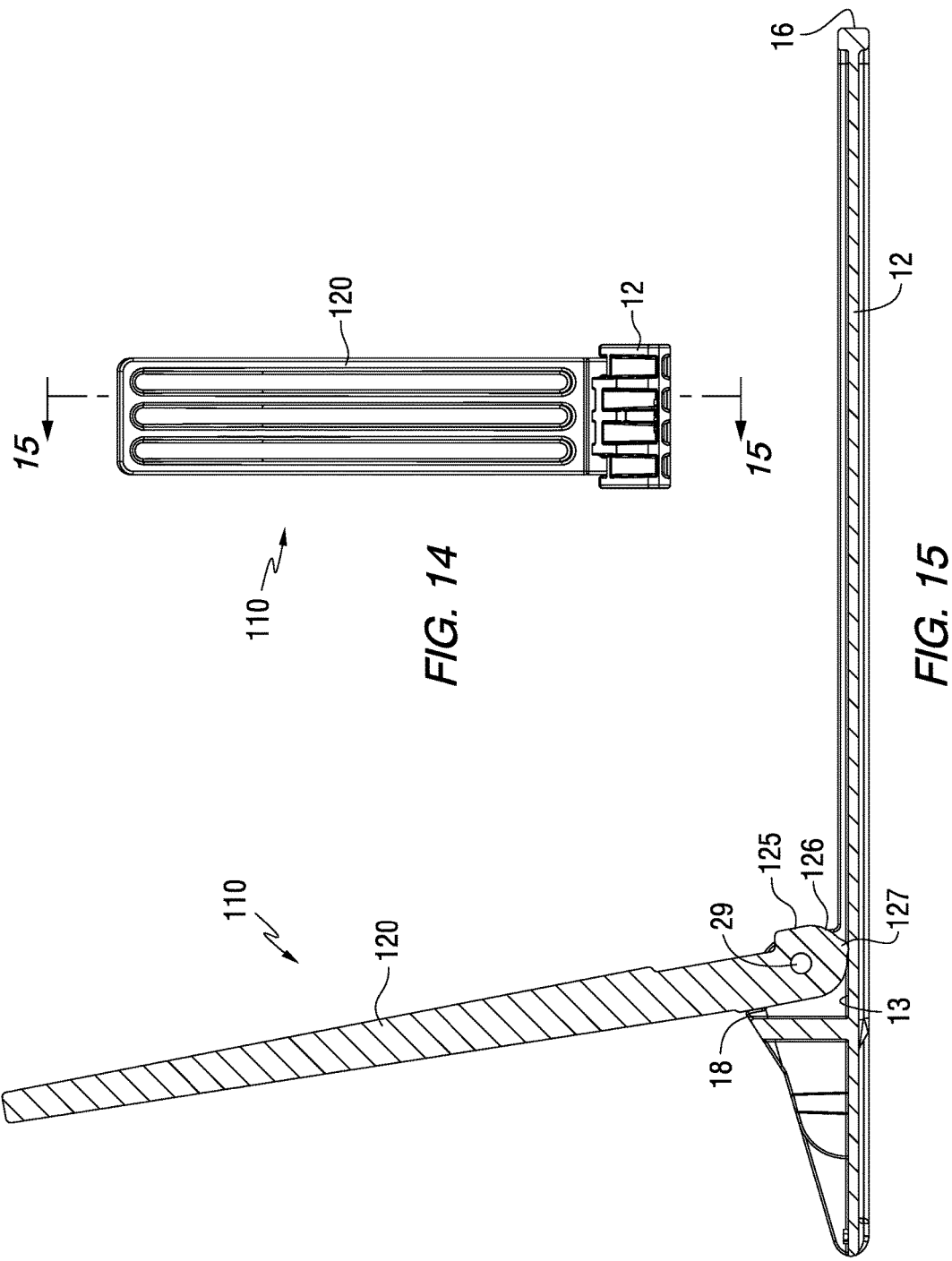

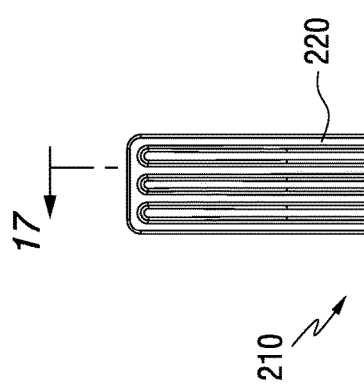
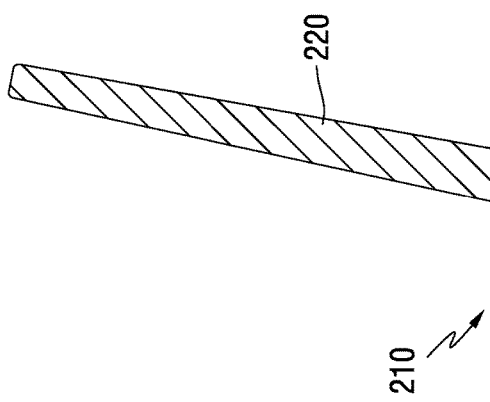
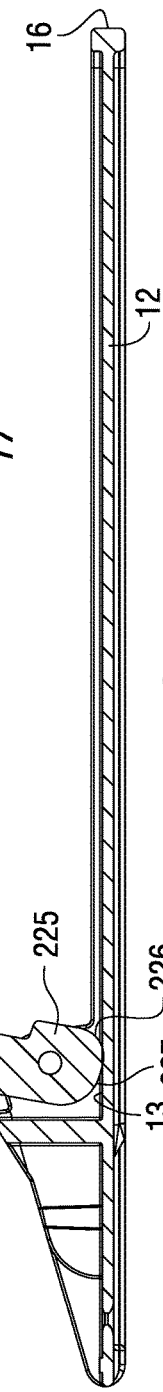

COLLAPSIBLE FLUID CONTAINMENT DEVICES WITH LOCKING SIDEWALL BRACES

CROSS-REFERENCE TO RELATED APPLICATION

This application claims the benefit of U.S. Provisional Patent Application Ser. No. 62/097,903 filed Dec. 30, 2014, which is incorporated herein by reference.

FIELD OF THE INVENTION

The present invention relates to collapsible fluid containment devices, and more particularly relates to locking sidewall support braces for use in fluid containment devices.

BACKGROUND INFORMATION

Portable collapsible liquid containment devices are used to prevent hazardous fluids from entering the environment from, for example, spillage of the fluids during loading and unloading of transport vehicles, wash-down of equipment and vehicles, and repair/maintenance of equipment and vehicles. Typically one or more sides of the containment device can be lowered and laid flat so that the equipment or vehicle can easily enter the containment area. Once the equipment or vehicle is inside, the sidewall(s) are then raised to prevent fluids from escaping. Any spilled fluid or wash-down fluid is retained within the container and can be pumped out for proper disposal. After the container is emptied, the sidewall(s) can be lowered again to remove the equipment or vehicle. The container can then be folded or rolled-up for storage and transport.

Such containment devices are typically made with a flexible barrier material, such as a rubberized fabric, reinforced polyvinyl chloride (PVC), reinforced thermoplastic polyurethane (TPU) and/or a heavy gauge polymer film. During use, the containment device is unfolded/unrolled and the sides extended to a generally vertical position to achieve its fluid retaining capability. To maintain the sidewalls in this generally vertical position, collapsible sidewall braces may be employed, as exemplified in U.S. Pat. Nos. 5,316,175; 5,762,233; 6,092,686; 6,880,720; and 8,562,251 and published US Patent Application Nos. 2013/0240538 and 2014/0246441, which are incorporated herein by reference.

SUMMARY OF THE INVENTION

The present invention provides portable collapsible fluid containment devices comprising sidewall support braces that rotate from a collapsed generally horizontal position to a raised generally vertical position and lock into place. The sidewall braces may be attached to at least one sidewall of the containment device, and when raised support the sidewall in a fluid containment configuration. The sidewall braces comprise a base support leg, a sidewall support arm rotatably mounted on the support leg, and a locking tab for holding the sidewall support arm in the generally vertical position.

An aspect of the present invention is to provide a collapsible fluid containment device comprising a collapsible sidewall, and a plurality of sidewall braces attached to the collapsible sidewall, wherein each sidewall brace comprises a base support leg, and a sidewall support arm pivotally mounted on the base support leg around an axis of rotation, wherein the sidewall support arm comprises a locking tab including a radial projection extending from the locking tab radially from the axis of rotation engageable with an upper surface of the base support leg.

Another aspect of the present invention is to provide a sidewall brace for use in a collapsible fluid containment device, the sidewall brace comprising a base support leg, and a sidewall support arm pivotally mounted on the base support leg and rotatable around an axis of rotation from a collapsed position in which the sidewall support arm is substantially parallel with the base support leg to a raised position in which the sidewall support arm is substantially perpendicular to the base support leg, wherein the sidewall support arm comprises a locking tab engageable with a contact surface of the base support leg to thereby resist movement of the sidewall support arm from its raised position to its collapsed position.

These and other aspects of the present invention will be more apparent from the following description.

BRIEF DESCRIPTION OF THE DRAWINGS

FIG. 8 is an end view of a raised locking sidewall brace in accordance with an embodiment of the present invention.

FIG. 9 is a sectional view of the locking sidewall brace taken through section 9-9 of FIG. 8.

FIG. 10 is an end view of a collapsed locking sidewall brace in accordance with another embodiment of the present invention.

FIG. 11 is a sectional view of the locking sidewall brace taken through section 11-11 of FIG. 10.

FIG. 12 is an end view of the locking sidewall brace of FIGS. 10 and 11 with its sidewall support arm rotated to an intermediate position.

FIG. 13 is a sectional view of the locking sidewall brace taken through section 13-13 of FIG. 12.

FIG. 14 is an end view of the locking sidewall brace of FIGS. 10-13 in a fully raised position.

FIG. 15 is a sectional view of the locking sidewall brace taken through section 15-15 of FIG. 14.

FIG. 16 is an end view of a locking sidewall brace in an intermediate position between a collapsed position and a fully raised position in accordance with an embodiment of the present invention.

FIG. 17 is a sectional view of the locking sidewall brace taken through section 17-17 of FIG. 16.

DETAILED DESCRIPTION

Figure 1:
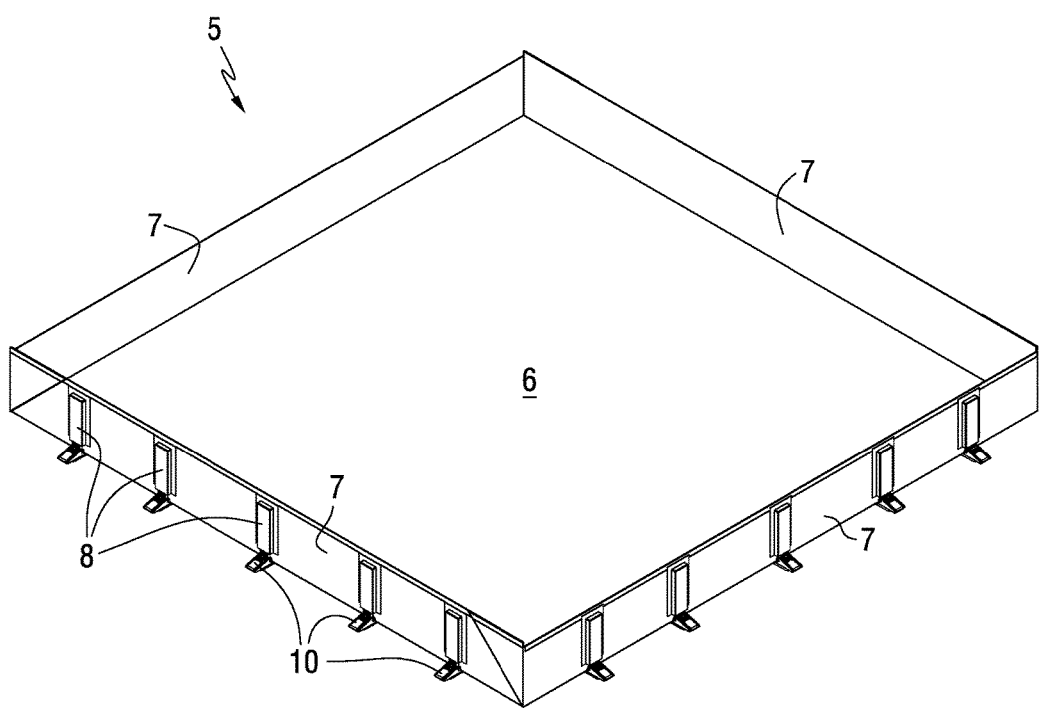
FIG. 1 is an isometric view of a fluid containment device including multiple locking sidewall braces in accordance with an embodiment of the present invention.

FIG. 1 illustrates a fluid containment device 5 in accordance with an embodiment of the present invention. The containment device 5 includes a bottom panel 6 and multiple collapsible sidewalls 7. The bottom panel 6 and sidewalls 7 may be made of any suitable type of fluid-impermeable material, such as rubberized fabric, reinforced polyvinyl chloride (PVC), reinforced thermoplastic polyurethane (TPU) and/or a heavy gauge polymer film, and the like. Each sidewall 7 includes multiple bracket-receiving pockets 8. Each pocket 8 receives a sidewall support arm of a sidewall brace 10, as more fully described below. Similar pockets (not shown) may be provided under the bottom panel 6 to receive base support legs of the sidewall braces 10.

FIGS. 2-9 illustrate a locking sidewall brace 10 in accordance with an embodiment of the present invention. The locking sidewall brace 10 includes a base support leg 12 having a first end 14 and a second end 16. The base support leg 12 includes a contact surface 13. A raised portion 15 of the base support leg 12 is provided near the first end 14 of the base support leg 12. The base support leg 12 includes support ribs 17 terminating in stop members 18. A hole 19 is provided through the base support leg for receiving a stake (not shown) or other mechanical device for securing the locking sidewall brace 10 to the ground during use.

Figure 2:
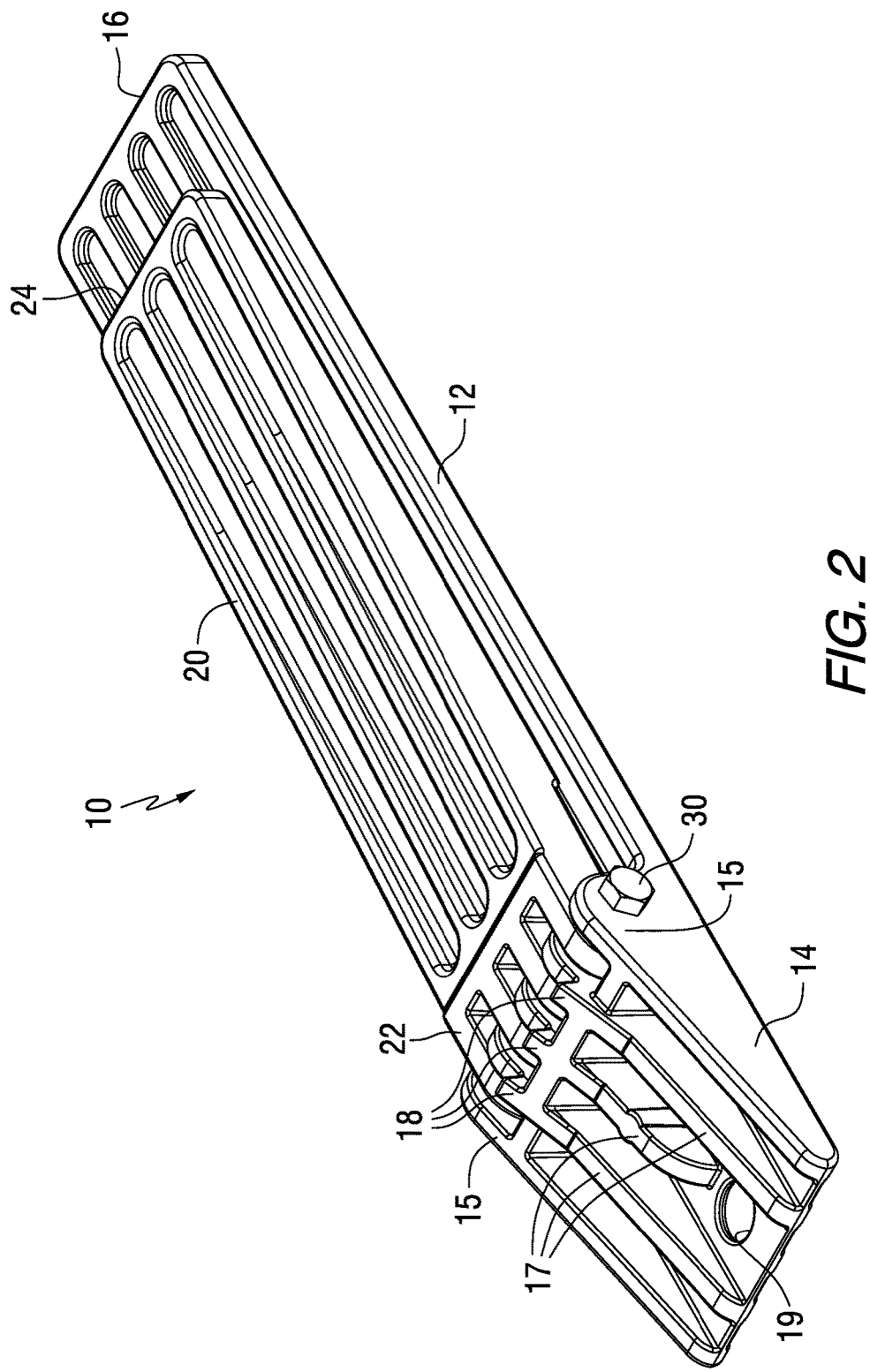
FIG. 2 is an isometric view of a locking sidewall brace in a collapsed position in accordance with an embodiment of the present invention.
Figure 3:
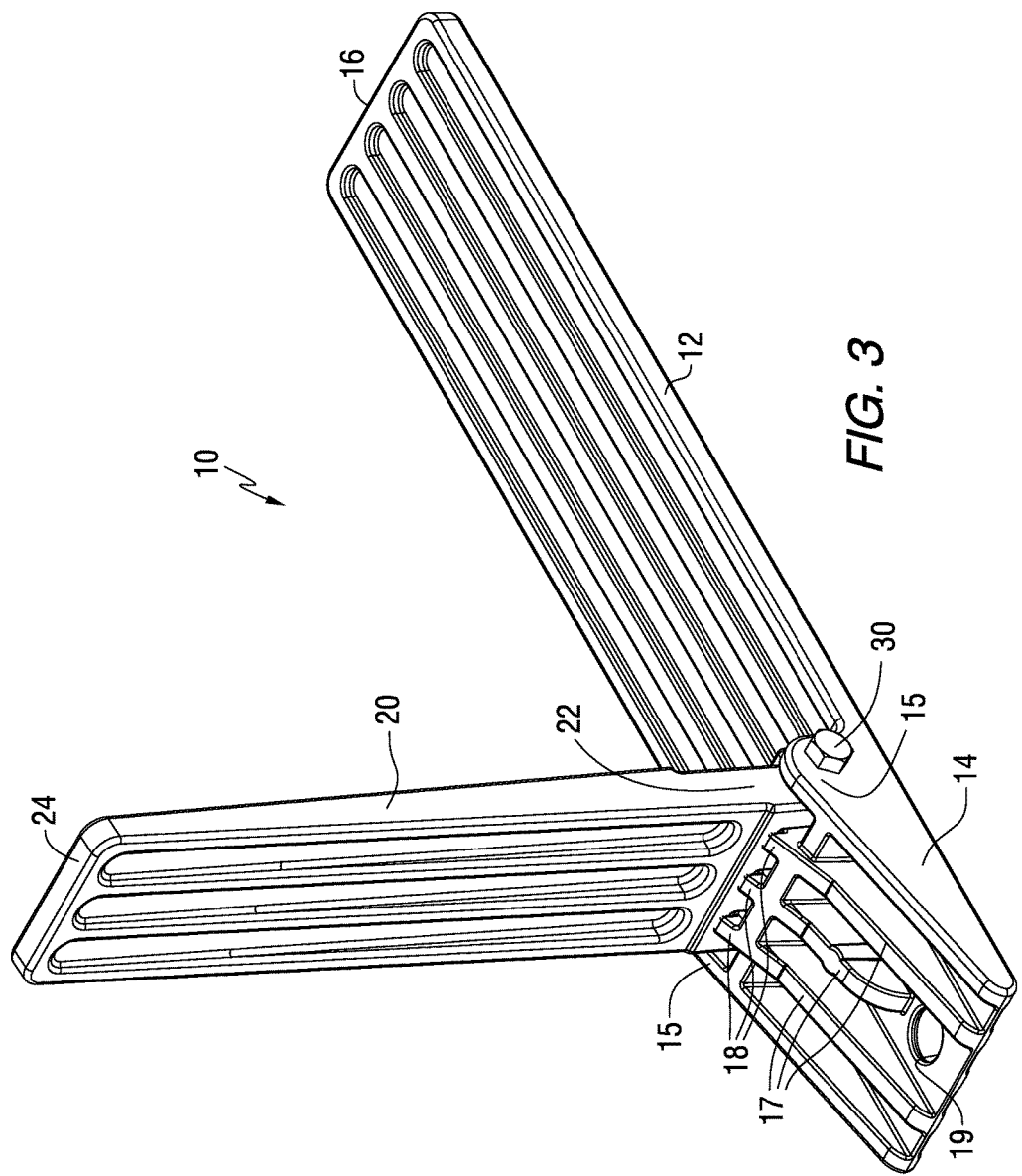
FIG. 3 is an isometric view of a locking sidewall brace in a raised position in accordance with an embodiment of the present invention.
Figure 4:
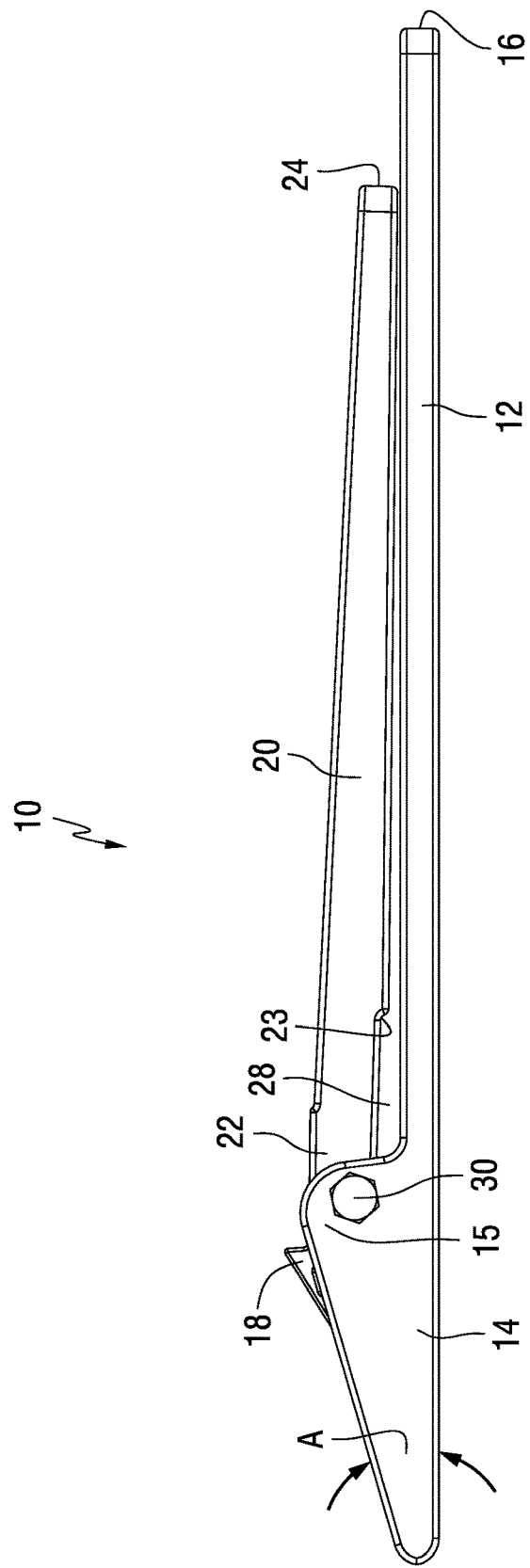
FIG. 4 is a side view of a locking sidewall brace in a collapsed position in accordance with an embodiment of the present invention.

As shown in FIGS. 2 and 4, the first end 14 of the base support leg 12 and the support ribs 17 form a low-profile ramp having a ramp angle A measured from a horizontal plane. The ramp angle A is selected to facilitate the travel of wheeled vehicles over the sidewall brace 10, e.g., when traversing the sidewall 7 upon entering or exiting the containment area of the containment device 5. The ramp angle A may typically range from 5° to 45°, for example, from 10° to 30°, or from 15° to 25°. This section is tapered downward and away from the containment area. This allows the wheels of vehicles and equipment entering the containment area when the sidewall is down roll easily over the brace.

Figure 5:
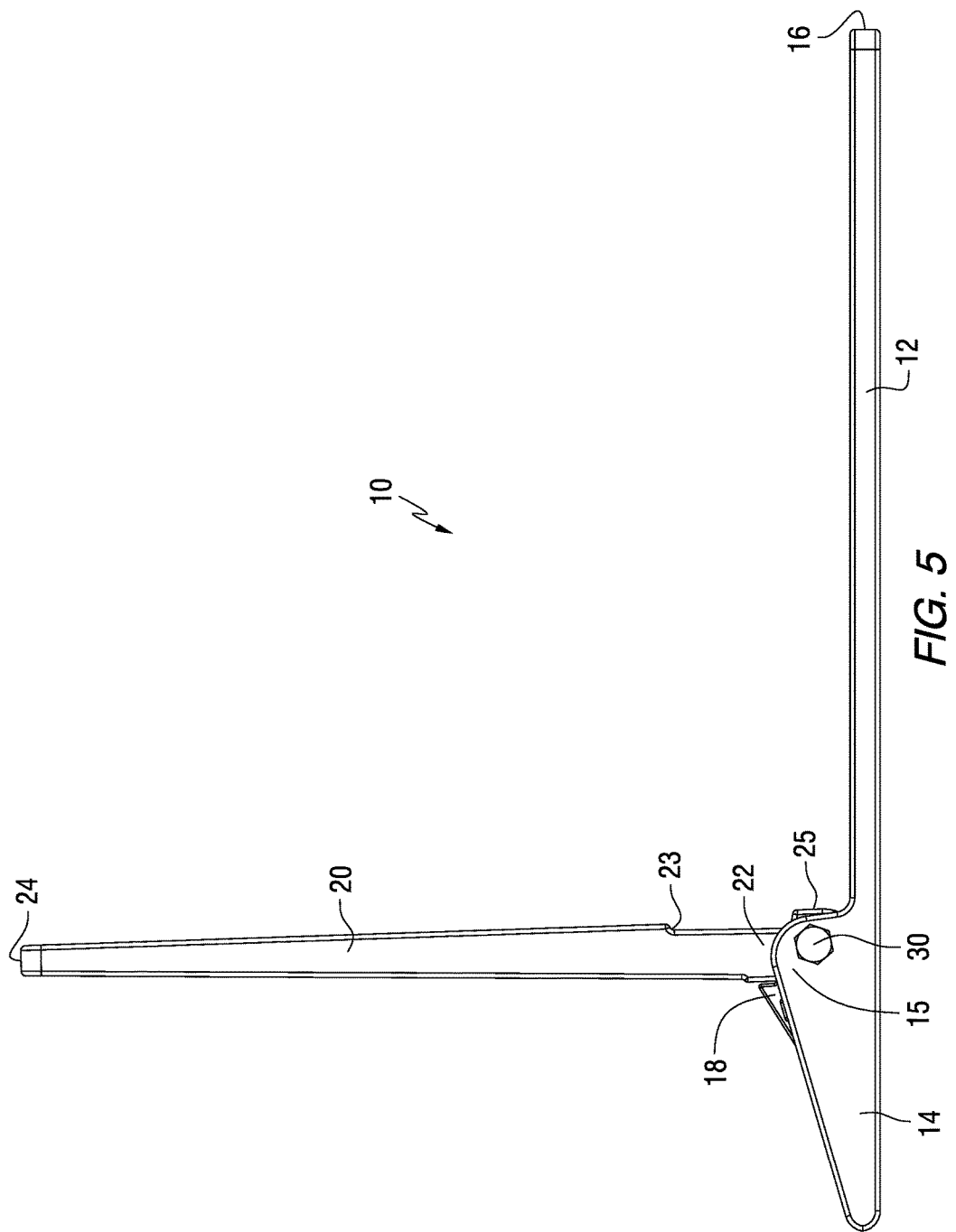
FIG. 5 is a side view of a locking sidewall brace in a raised position in accordance with an embodiment of the present invention.
Figure 6:
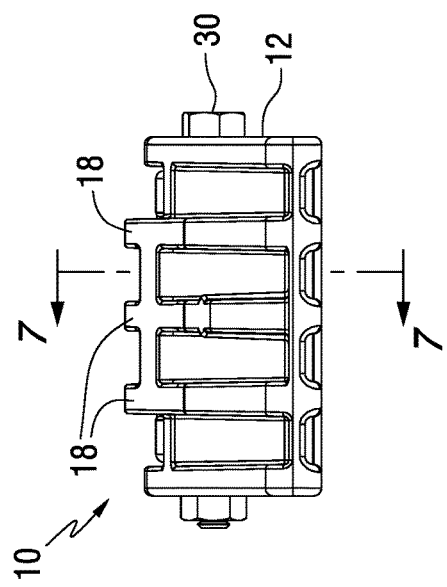
FIG. 6 is an end view of a collapsed locking sidewall brace in accordance with an embodiment of the present invention.
Figure 7:
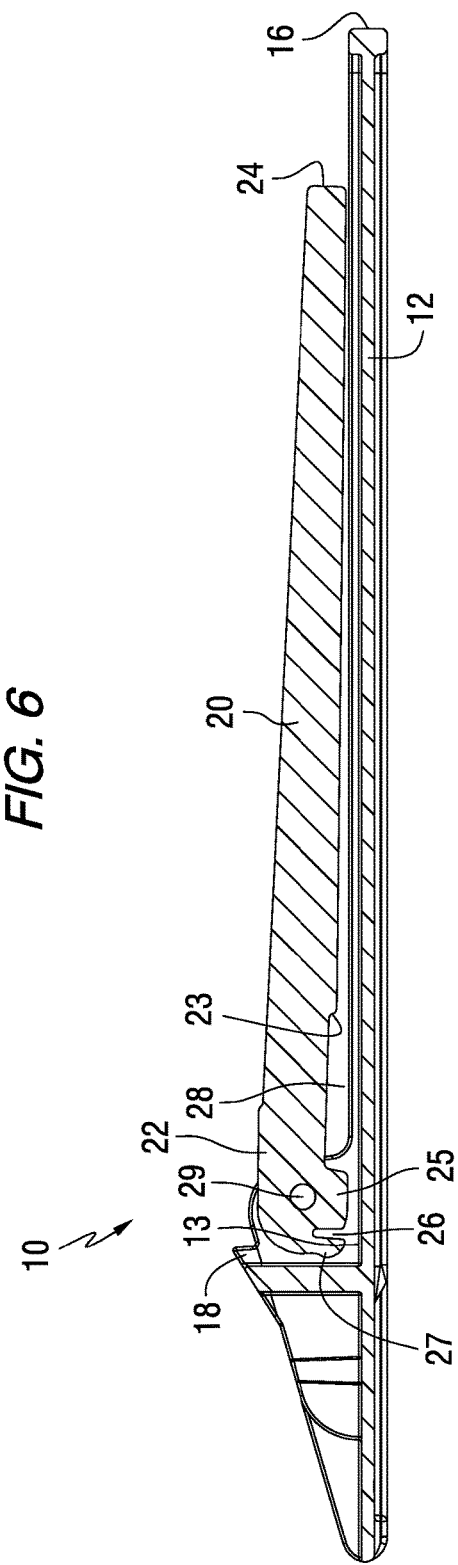
FIG. 7 is a sectional view of the locking sidewall brace taken through section 7-7 of FIG. 6.

The locking sidewall brace 10 also includes a rotatable sidewall support arm 20 having a first end 22 and a second end 24. A cut-out portion 23 is provided in the sidewall support arm 20 near the first end 22. As shown most clearly in the sectional views of FIGS. 7 and 9, the rotatable sidewall support arm 20 includes an eccentric locking tab 25 near the first end 22. The locking tab 25 includes a notch 26 and a radial projection 27. As more fully described below, when the sidewall support arm 20 is rotated from the substantially horizontal collapsed position shown in FIG. 7 to the substantially vertical raised position shown in FIG. 9, the radial projection 27 of the locking tab 25 presses against and moves across the contact surface 13 of the base support leg 12 when the sidewall support arm 20 reaches a predetermined rotational position. Once the sidewall support arm 20 is rotated to its fully raised position, the locking tab 25 acts to resist rotation of the sidewall support arm 20 back to its collapsed position. The notch 26 in the locking tab 25 provides resiliency and spring action for the radial projection 27 as it moves over the contact surface 13. A pivot hole 29 is provided through the sidewall support arm 20 for receiving a pivot pin 30 around which the sidewall support arm 20 rotates in relation to the base support leg 12. As shown in FIGS. 5 and 9, the stop members 18 of the base support leg 12 contact the first end 22 of the sidewall support arm 20 when it is in the raised position, thereby providing a mechanical stop that prevents the sidewall support arm 20 from rotating beyond the desired extended position.

FIGS. 10-15 illustrate a locking sidewall brace 110 in accordance with another embodiment of the present invention. Similar element numbers are used in FIGS. 10-15 for common features that are present in the embodiment of FIGS. 2-9. FIGS. 10 and 11 illustrate the locking sidewall brace 110 with its rotatable sidewall support arm 120 in a collapsed position. FIGS. 12 and 13 illustrate the locking sidewall brace 110 with the rotatable sidewall support arm 120 in an intermediate position. FIGS. 14 and 15 illustrate the locking sidewall brace 110 with the rotatable sidewall support arm 120 in a fully raised position. The rotatable support arm 120 includes an eccentric locking tab 125 having a curved contact surface 126 and a radial projection 127. The curved contact surface 126 may be circular and is circumferentially spaced from the radial projection 127, as measured around the axis of rotation of the sidewall support arm 120. The radial projection 127 contacts the contact surface 13 of the support leg 12 when the support arm 120 is rotated from the raised position to the collapsed position to thereby help hold the support arm 120 in its raised position.

FIGS. 16 and 17 illustrate a locking sidewall brace 210 in accordance with a further embodiment of the present invention. In this embodiment, similar element numbers are used to describe the same features found in the previous embodiments. The locking sidewall brace 210 includes a rotatable sidewall support arm 220, which is shown in an intermediate position in FIGS. 16 and 17 between a fully collapsed position and a fully raised position. The rotatable sidewall support arm 220 includes an eccentric locking tab 225 with a curved contact surface 226 and a radial projection 227. The curved contact surface 226 and radial projection 227 form a cammed configuration in which the radial projection provides a cam surface. The cam surface of the radial projection 227 contacts the contact surface 13 of the support leg 12 when the support arm 220 is rotated from the raised position to the collapsed position to thereby help hold the support arm 220 in its raised position.

Due to the eccentric shapes of the locking tabs 25, 125 and 225, the sidewall support arms 20, 120 and 220 of the sidewall braces 10, 110 and 210 offer minimal resistance to rotation from their initial collapsed horizontal positions until the support arms have rotated upward, e.g., to approximately 75° from horizontal. At this point, resistance or torque increases, e.g., for approximately 5° to 15° of rotation, then returns to minimal resistance until the support arms 20, 120, 220 contact the mechanical stops 18. In certain embodiments, the frictional engagement between the locking tabs 25, 125 and 225 and the contact surface 13 of the base support leg 12 occurs at a resistance angle of from 60° to 90° from a horizontal plane, for example, from 70° to 80°. In certain embodiments, the locking tabs may have single or multiple radial projections. The radial projections may have a curvilinear profile as shown in the figures, or an angular profile such as a ratchet tooth. Projection(s) may also be included on the base support leg 12 to contact the radial projection(s) of the sidewall support arms 20, 120 and 220.

In order for the sidewall support arms 20, 120 and 220 to rotate beyond about 75°, either the locking tabs 25, 125 and 225, or the contacted surface 13 of the base support leg 12, or both, may flex to provide clearance for the sidewall support arms 20, 120 and 220 to continue rotation. Such flexing provides the rotational resistance for the locking mechanism. The rotation resistance may be lower than torque exerted by hydrostatic pressure of a contained liquid when it presses against the sidewall 7. The rotation resistance may be controlled by the spacing of the sidewall braces 10 from each other, the vertical design height of the containment device, and the specific gravity of the liquid being contained. For example, a minimal level may be about 4 pound-inches in order to resist wind gusts and other forces from unintentionally lowering the sidewall when the containment device is empty of liquid.

The mechanical stops 18 may be located to prevent the support arms 20, 120 and 220 from rotating past approximately 90° from horizontal. For example, the mechanical stops 18 may stop rotation of the sidewall support arms 20, 120 and 220 at a stop angle of from 90° to 120°, or from 100° to 110°, or at about 105°, from horizontal. The support arms 20, 120 and 220 are thus trapped or locked in an upright position between the mechanical stops 18 and the high rotation resistance position of the support arms 20, 120 and 220 when their locking tabs 25, 125 and 225 engage the contact surface 13 of the base support leg 12. For example, such an upright range may be from 60° to 120° from horizontal, typically between 70° and 110°, or between 75° and 105°, all of which are inclusive of 90°. To lower the support arms 20, 120 and 220, a sufficient amount of torque is applied against the support arms 20, 120 and 220 to overcome the high rotation resistance of the locking tabs 25, 125 and 225.

In the various embodiments illustrated in FIGS. 2-17, the base support leg 12 and the sidewall support arms 20, 120 and 220 may be made of any suitable material, e.g., injection molded from plastic. For example, the legs and arms may be made from nylon or filled nylon for strength. Alternately any moldable plastic can be used or they can be cast or machined from metal such as aluminum. The support legs and support arms can be made of separate material types. The pivot pin 30 is preferably made from a non-oxidizing material such as stainless steel. For example, the pivot pin 30 can be a stainless steel shoulder bolt retained by a stainless steel lock nut. Alternately, the pivot pin 30 can be made of plastic and can be molded as an integral section of the either the horizontal support leg or the support arm.

Each horizontal support leg 12 may be attached to the underside of the containment device floor 6, and each support arm 20, 120, 220 may be attached to the sidewall 7 of the containment device 5. For example, the support arms 20, 120 and 220 may be inserted in the pockets 8 attached to the sidewalls 7. In addition, the base support legs 12 may be inserted in pockets (not shown) under the bottom panel 6. In the embodiment shown, the pockets 8 are attached to the exterior side of the sidewall 7. Alternatively, pockets may be provided on the interior of the sidewall 7, in which case the sidewall braces 10 may be located inside the sidewall 7 with their sidewall support arms inside the pockets and their base support legs inserted into pockets located above the bottom panel 6. As described above, each sidewall support arm 20, 120 and 220 can be rotated from a horizontal position to an approximate vertical position as to raise the containment sidewall. To lower the sidewall the support arm is returned to the horizontal position. The direction of rotation of the support arms 20, 120 and 220 may be such that it pivots downward toward the interior of the containment device 5 when the sidewall 7 is lowered.

An advantage of having little or no initial rotational resistance of the support arms 20, 120 and 220 when they are in their collapsed positions is that the hydrostatic pressure of a liquid entering the containment device 5 when the sidewall(s) 7 are lowered is sufficient to self-rise the sidewall(s) 7 to a position above the liquid height. As the height of the fluid level rises in the containment device 5, so does the sidewall height. When the sidewall(s) 7 reach a height corresponding to about 75° of rotation, the hydrostatic pressure of the liquid has increased enough to force the support arms 20, 120 and 220 through the high rotation resistant section and back against the mechanical stop 18 so that the sidewall 7 is in its fully raised and locked position.

For example, in a containment device having a designed liquid retaining height of 12 inches and sidewall braces 10 spaced every 2 feet, the liquid can easy rotate the sidewall braces 10 and sidewall 7 to a height of about 11.6 inches (75° of rotation). When a liquid having a specific gravity of approximately 0.9 reaches a height of 11 inches, it exerts torque (the hydrostatic pressure) against the sidewall 7 of approximately 68 pound-inch along a 2 foot length of sidewall 7. If the greatest rotational resistance of the sidewall braces 10 is less than approximately 68 lb. in, the hydrostatic pressure will force the sidewall braces 10 and sidewall 7 they are attached to past the high rotation resistant section and toward the mechanical stop 18.

Whereas particular embodiments of this invention have been described above for purposes of illustration, it will be evident to those skilled in the art that numerous variations of the details of the present invention may be made without departing from the invention as defined in the appended claims.

What is claimed is:

1. A collapsible fluid containment device comprising:
   a collapsible sidewall; and
   a plurality of sidewall braces attached to the collapsible sidewall, wherein each sidewall brace comprises:
   a base support leg; and
   a sidewall support arm pivotably mounted on the base support leg around an axis of rotation, wherein the sidewall support arm comprises a locking tab including a radial projection extending from the locking tab radially from the axis of rotation that is frictionally engageable with an upper surface of the base support leg to resist rotational movement of the sidewall support arm when the sidewall support arm is rotated from the raised position toward the collapsed position, the locking tab is spaced from the upper surface of the base support leg when the sidewall support arm is in a collapsed position, and the locking tab comprises a curved surface circumferentially spaced from the radial projection around the axis of rotation.

2. The collapsible fluid containment device of claim 1, wherein the sidewall support arm of each sidewall brace is inserted in a pocket on the collapsible sidewall.

3. The collapsible fluid containment device of claim 2, wherein the base support leg of each sidewall brace is positioned under a bottom panel of the fluid containment device.

4. The collapsible fluid containment device of claim 1, wherein the fluid containment device comprises four of the collapsible sidewalls and a plurality of the sidewall braces are attached to each of the collapsible sidewalls.

5. The collapsible fluid containment device of claim 1, wherein the collapsible sidewall and the support arms of each of the sidewall braces are movable from collapsed positions to raised positions when subjected to hydrostatic force applied by a fluid contained in the fluid containment device.

6. The collapsible fluid containment device of claim 1, wherein the locking tabs of the sidewall support arms hold the sidewall support arms and the sidewall in raised positions and resist rotation of the sidewall support arms from their raised positions to collapsed positions by the frictional engagement between the radial projections extending from each locking tab and the upper surface of each support leg.

7. The collapsible fluid containment device of claim 6, wherein the frictional engagement occurs when each sidewall support arm is rotated to a resistance angle of from 60° to 90° measured from a horizontal plane.

8. The collapsible fluid containment device of claim 7, wherein the resistance angle is from 70° to 80°.

9. The collapsible fluid containment device of claim 1, wherein the base support leg of each sidewall brace comprises a ramp tapered downward and away from the sidewall at a ramp angle of from 10° to 30° measured from a horizontal plane.

10. A sidewall brace for use in a collapsible fluid containment device, the sidewall brace comprising:
   a base support leg; and
   a sidewall support arm pivotally mounted on the base support leg and rotatable around an axis of rotation from a collapsed position in which the sidewall support arm is substantially parallel with the base support leg to a raised position in which the sidewall support arm is substantially perpendicular to the base support leg, wherein the sidewall support arm comprises a locking tab engageable with a contact surface of the base support leg to thereby resist movement of the sidewall support arm from its raised position to its collapsed position, and the locking tab is spaced from the upper surface of the base support leg when the sidewall support arm is in the collapsed position,
   wherein the locking tab comprises a radial projection that is frictionally engageable with the contact surface of the base support leg to resist rotational movement of the sidewall support arm when the sidewall support arm is rotated from the raised position toward the collapsed position, and wherein the locking tab comprises a curved surface circumferentially spaced from the radial projection around the axis of rotation.

11. The sidewall brace of claim 10, wherein the locking tab is eccentric around the axis of rotation.

12. The sidewall brace of claim 10, wherein the frictional engagement occurs when the sidewall support arm is rotated to a resistance angle of from 90° to 60° measured from a horizontal plane.

13. The sidewall brace of claim 12, wherein the resistance angle is from 80° to 70°.

14. The sidewall brace of claim 10, wherein the radial projection comprises a cam surface of the locking tab.

15. The sidewall brace of claim 10, wherein a portion of the base support leg comprises a ramp tapered downward and away from the axis of rotation.

16. The sidewall brace of claim 15, wherein the ramp has a ramp angle of from 10° to 30° measured from a horizontal plane.

17. The sidewall brace of claim 10, wherein the base support leg comprises a lower cut-out portion adjacent to the axis of rotation.

18. A sidewall brace for use in a collapsible fluid containment device, the sidewall brace comprising:
   a base support leg; and
   a sidewall support arm pivotally mounted on the base support leg and rotatable around an axis of rotation from a collapsed position in which the sidewall support arm is substantially parallel with the base support leg to a raised position in which the sidewall support arm is substantially perpendicular to the base support leg,
   wherein the sidewall support arm comprises a locking tab engageable with a contact surface of the base support leg to thereby resist movement of the sidewall support arm from its raised position to its collapsed position, the locking tab is spaced from the upper surface of the base support leg when the sidewall support arm is in the collapsed position, the locking tab comprises a radial projection that is frictionally engageable with the contact surface of the base support leg to resist rotational movement of the sidewall support arm when the sidewall support arm is rotated from the raised position toward the collapsed position, and the locking tab comprises a notch radially inside the radial projection.

* * * * *